United States Patent

Backman, Jr.

[11] 4,054,862
[45] Oct. 18, 1977

[54] RANGING SYSTEM WITH RESOLUTION OF CORRELATOR AMBIGUITIES

[75] Inventor: William R. Backman, Jr., Portsmouth, R.I.

[73] Assignee: Raytheon Company, Lexington, Mass.

[21] Appl. No.: 626,581

[22] Filed: Oct. 28, 1975

[51] Int. Cl.² .................................................. G01S 9/68
[52] U.S. Cl. .................................. 340/3 R; 343/100 CL
[58] Field of Search .................. 343/100 CL; 40/3 R, 40/3 F, 1 R

[56] References Cited

U.S. PATENT DOCUMENTS

| | | | |
|---|---|---|---|
| 3,454,922 | 7/1969 | Dory | 340/1 R |
| 3,750,152 | 7/1973 | Waful | 340/3 R |
| 3,786,405 | 1/1974 | Chramiec et al. | 340/3 R |

Primary Examiner—Richard A. Farley
Attorney, Agent, or Firm—David M. Warren; Joseph D. Pannone; Milton D. Bartlett

[57] ABSTRACT

A ranging system, particularly useful for sonic depth sounding employing a receiver utilizing one bit sampling of received echoes. A correlator correlates a sequence of one bit samples against a sequence of reference samples, such a sequence of reference samples being conveniently provided by a transmitter of sound waves. An envelope detector circuit provides the envelope of received echoes and a peak detector provides the time of occurrence of the peak of the envelope. A gate generator responsive to the time of occurrence of the envelope peak provides a gate signal which brackets a succession of output pulse signals from the correlator to delineate coarse range or depth while individual output pulses within the gated interval are applied to a second peak detector to give a range or a depth reading corresponding to the time of occurrence of the maximum output pulse of the correlator.

9 Claims, 6 Drawing Figures

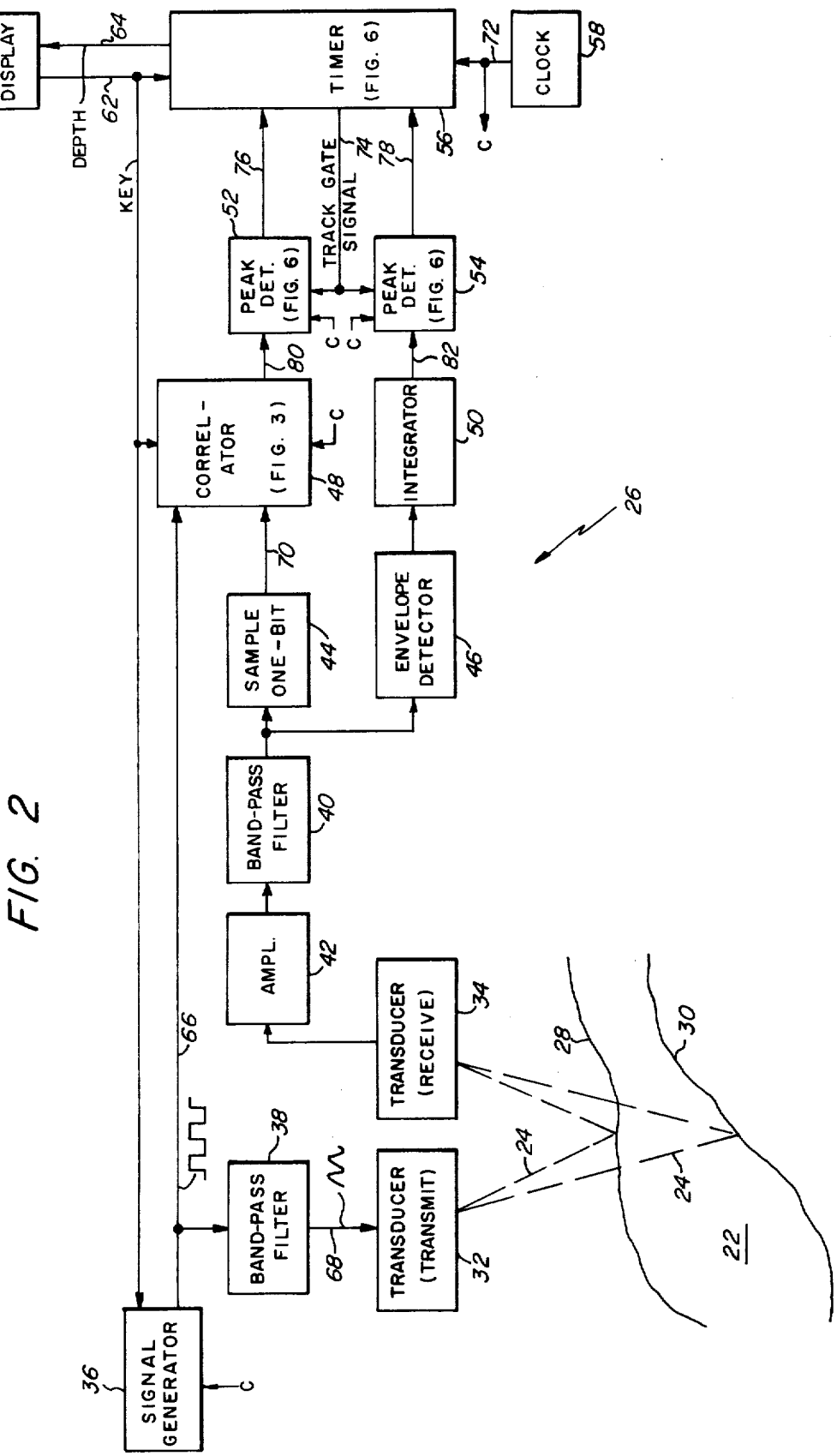

RANGING SYSTEM WITH RESOLUTION OF CORRELATOR AMBIGUITIES

BACKGROUND OF THE INVENTION

Correlation techniques are frequently employed in ranging and depth finding systems. Of particular interest in the sonar depth sounding situation is a correlator operating with one bit samples of the received echo. A one bit sampler, or hard limiter, precedes the correlator as is disclosed in the U.S. Pat. No. 3,786,405 which issued to M. A. Chramiec and W. L. Konrad on Jan. 15, 1974. Such a correlator is particularly useful in sonar sounding applications since it readily accomplishes a correlation between a phase modulated signal and a phase modulated reference and has great simplicity of structure as compared to a correlator which is capable of processing multiple bit samples of data. Such a correlator gives a clear output signal in response to echoes received from flat bottoms in the ocean.

A problem arises in the situation wherein the aforementioned one bit correlator is utilized in depth sounding situations wherein the ocean bottom is sloping with angles of slope in excess of 5°. As will be explained hereinafter, a reflecting surface, such as the sloping bottom, which is inclined relative to the direction of propagation of a beam of sound from a sonar transmitter produces a train of echoes occurring in rapid succession. Where the time intervals between these rapidly occurring echoes is much less than a time interval equal to the reciprocal of the correlator bandwidth, numerous echo pulses appear at the output of the correlator and each of these output pulses has amplitudes substantially reduced from that of a single output pulse as would be produced in response to an echo from a flat bottom under identical conditions of a signal-to-noise ratio. As a result, it is difficult for an operator to determine which of the rapidly occurring reduced amplitude pulses represents the depth of the ocean bottom and, there is a similar difficulty involved in the implementation of an automatic depth tracking circuit.

SUMMARY OF THE INVENTION

The aforementioned problem is overcome and other advantages are provided by a ranging system which, in accordance with the invention, includes a receiver of sonic echoes, the receiver including a one bit sampler or hard limiter having its output coupled to a one bit correlator such as that disclosed in the aforementioned patent to Chramiec and Konrad. Prior to sampling by the one bit sample, the received echo signals in a preferred embodiment of the invention are first amplified and filtered by a band-pass filter whereupon they are applied to the one bit sampler. The filtered echo signals are also applied to an envelope detector circuit which preferably includes filtering, as by an integrator, to match the characteristics of the envelope detection circuit to that of the envelope of received echoes. The output of the envelope detection circuit is applied to a peak detector similar to that disclosed in FIG. 3 of U.S. Pat. No. 3,852,705 which issued to W. R. Backman and G. M. Walsh on Dec. 3, 1974. A gate generating circuit responsive to an output signal of the peak detector provides a gating signal which brackets the time of occurrence of a succeeding echo, a succession of such echoes being produced in response to a succession of sonic transmissions toward the ocean bottom as may be produced by a system analogous to that taught in the aforementioned patent to Backman and Walsh. A second peak detector is coupled to an output port of the correlator and is gated by the gating signal to provide the time of occurrence of the maximum correlator output occurring during the interval of the gating signal, the output of the second peak detector occurring at an instant of time which corresponds to the depth of the ocean bottom.

BRIEF DESCRIPTION OF THE DRAWINGS

The aforementioned aspects and other features of the invention are explained in the following description taken in connection with the accompanying drawings, wherein:

FIG. 2 is a block diagram of the ranging system of the invention;

DESCRIPTION OF THE PREFERRED EMBODIMENT

Figure 1:
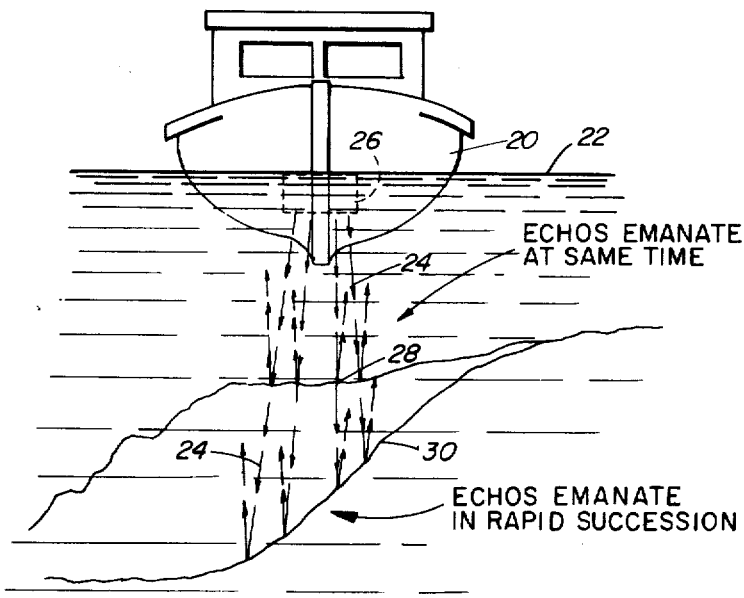
FIG. 1 is a stylized pictorial view of a ship carrying a ranging system in accordance with the invention, the figure showing level and slanted portions of the ocean bottom from which sonic energy is reflected.

Referring now to FIG. 1, there is seen a ship 20 sailing in the ocean 22 and transmitting waves 24 of sonic energy by means of a ranging system 26 incorporating the invention as will be further described in FIG. 2. The system 26 may be utilized in a downward looking sonar as portrayed in FIG. 1 for measuring the distance of reflecting surfaces, or may be utilized in a forward looking sonar such as that described in the U.S. Pat. No. 3,886,487, which issued in the name of George M. Walsh et al on May 27, 1975 for measuring the distances of reflecting surfaces ahead of the ship 20. The forward looking sonar disclosed in the aforementioned Walsh patent comprises a one bit correlator (disclosed in FIG. 5 therein) as does the present invention. The same type of one bit correlator is also disclosed in FIG. 4 of the aforementioned Chramiec patent.

Figure 3:
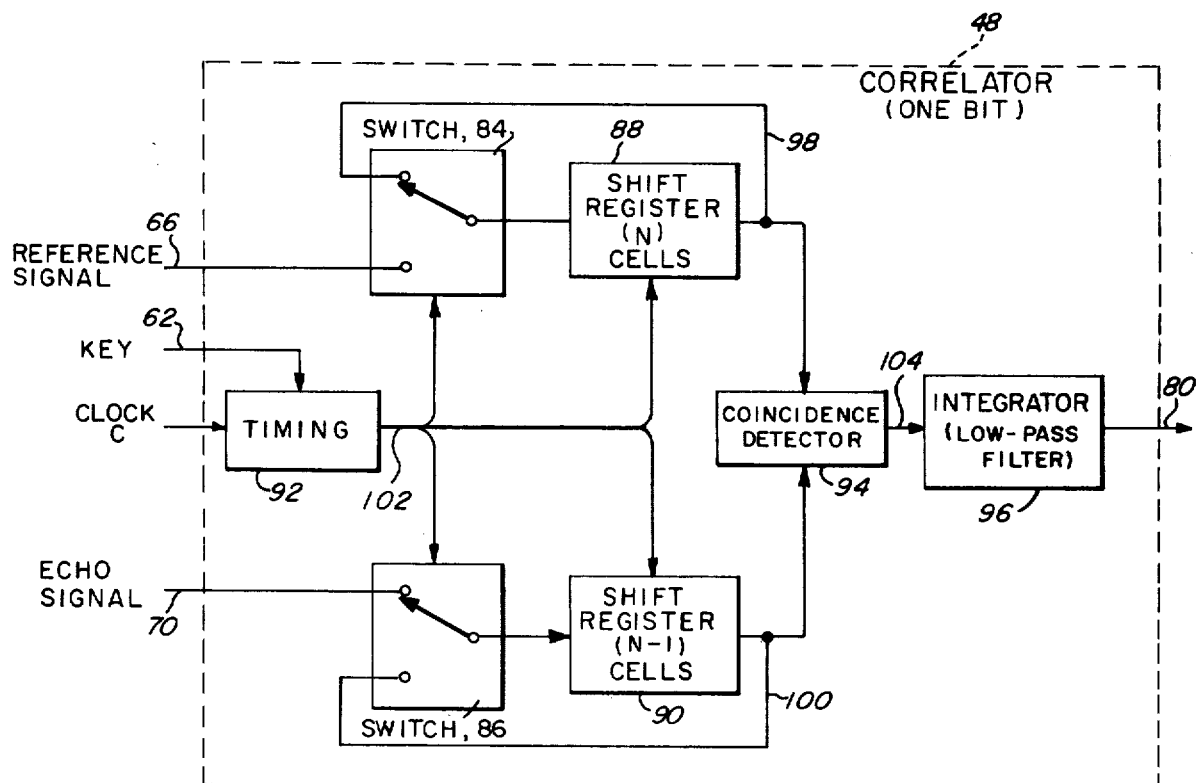
FIG. 3 is a block diagram of a one bit correlator referred to in FIG. 2.

FIG. 1 portrays the situation wherein the ship 20 is sailing from a position above the level bottom 28 and entering a channel having a sloping bottom 30. The waves 24 in a beam of sonic energy radiated downwardly by the system 26 are seen to gradually spread apart as they progress downwardly away from the ship 20, the amount of spreading being in accordance with the beam width of the transmitted sonic energy, to reflect off a region of the level bottom 28 and to reflect off a region of the sloping bottom 30. Of particular interest is the fact that, with respect to the waves 24 impinging upon the level bottom 28, all these waves are reflected upwardly at approximately the same instant of time to give a sharp, well-defined echo, while, with respect to the waves 24 impinging upon the sloping bottom 30, individual ones of these waves 24 are reflected from the sloping bottom 30 at differing instances of time because of the differing distances of each point on the sloping bottom 30 from the ship 20. Because of the differing times of reflection of the individual waves 24 from the sloping bottom 30, the resulting echo received by the system 26 has the appearance of a train of pulse signals occurring in rapid succession. As will be seen hereinafter, the one bit correlator of the system 26, shown in FIG. 3, provides a train of output pulse signals of diminished amplitude and in rapid succession, as will be disclosed hereinafter with reference to FIG. 5, and, accordingly, the system 26 incorporates envelope detection, peak detection and gating in accordance with the invention to utilize output signals of the one bit correlator in measuring the depth of the ocean 22, as was seen in FIG. 1.

Referring now to FIG. 2, there is seen a block diagram of the ranging system 26 which is seen to comprise a transmitting transducer 32 for transmitting the waves 24 of sonic energy towards the level bottom 28 and the sloping bottom 30, the reflections of sonic energy from the level bottom 28 and the sloping bottom 30 being received by a receiving transducer 34. The system 26 further comprises a signal generator 36, band pass filters 38 and 40, an amplifier 42, a sampler 44, an envelope detector 46, a correlator 48, and an integrator 50, peak detectors 52 and 54, a timer 56, a clock 58 and a display 60. The display 60 may be a conventional depth recorder such as that disclosed in FIG. 1 of the aforementioned Backman patent in which a switch (not shown in the instant specification) responsive to a position of a stylus makes electrical contact for transmitting a KEY signal along line 62 to the signal generator 36 and to the timer 56 to initiate an echo sounding interval. In response to the KEY signal, the generator 36 begins generation of another signal to be transmitted by the transducer 32 and the timer 56 begins measuring the elapsed time from the transmission of the signal by the transducer 32. Data representing the depth of the level bottom 28 and the sloping bottom 30 is provided by the timer 56 along line 65 to the display 60, to be recorded graphically and, also, if desired, to be displayed by a digital readout (not shown).

The generator 36 provides a train of pulses on line 66 during a prescribed interval of time, for example 64 milliseconds, the pulses of the pulse train signal being square wave pulses and having a pulse repetition frequency which is modulated in a prescribed format to give increased spectral bandwidth to the pulse train for increased resolution between points of reflection of sonic energy in the ocean 22 which are closely spaced in range from the transducer 32. The square wave signal on line 66 is passed through the filter 38 to appear as a sinusoid on line 68 which is converted into sonic energy by the transducer 32 for transmission into the ocean 22. The electric signal on line 68 as well as the sonic signal in the ocean 22 have the form of a carrier modulated pulse signal in which the carrier frequency is equal to the pulse repetition frequency of the square wave on line 66 and in which the duration of the pulse signal is equal to the duration of the pulse train on line 66. The signal on line 66 is also applied to the correlator 48 to serve as a reference signal, as will be seen in FIG. 3.

Echoes incident upon the transducer 34 are converted to electric signals and amplified by the amplifier 42 and then filtered by the filter 40 to remove extraneous noise characteristic of the ocean 22. The output of the filter 40 is a composite of many echo signals each of which has a wave form similar to that of the signal on line 68. The output of the filter 40 is coupled to the sampler 44 and to the envelope detector 46. The sampler 44 is a one bit sampler, such as a hard limiter, which converts a sinusoid to a waveform closely approximating a square wave, and provides on line 70 a square wave signal in which a high voltage or positive voltage represents a logic state of 1 while a low voltage or negative voltage represents a logic state of 0. The signal on line 70 serves as the input signal to the correlator 48. The detector 46 provides an envelope which is a composite of the echoes received from the level bottom 28 or from sloping bottom 30. The output signal of the detector 46 is applied to the integrator 50 which is conveniently implemented by means of a low pass filter having an impulse response which is matched to the envelope of anticipated echo signals.

The output of the correlator 48 is applied to a peak detector 52 while the output of the integrator 50 is applied to a second peak detector 54, identical to the peak detector 52. The correlator 48 and the peak detectors 52 and 54 are each driven by clock signals, C, provided by the clock 58 on lines 72. The peak detectors 54 and 54 are responsive to a track gate signal on line 74 provided by the timer 56 and provide signals respectively on lines 76 and 78 to the timer 56 in a manner to be described with reference to FIG. 6. The output signal of the correlator 48 on line 80 and the output signal of the integrator 50 on line 82 will be described hereinafter with reference to the graphs of FIGS. 4 and 5.

Referring now to FIG. 3, the correlator 48 is seen to comprise switches 84 and 86, shift registers 88 and 90, a timing unit 92, a coincidence detector 94, and an integrator 96. The switch 84 couples a signal from either line 66 or line 98 to the shift register 88, the line 98 coupling signals from the output of the shift register 88. The switch 86 couples signals from either line 70 or line 100 to the shift register 90, the line 100 coupling the signal from the output of the shift register 90. The timing unit 92 provides control signals on line 102 which are seen to fan out for providing individual control signals to each of the switches 84 and 86 and each of the shift registers 88 and 90. The output signals of the shift registers 88 and 90, respectively on lines 98 and 100, are coupled to the coincidence detector 94 which provides an output digital signal on line 104 and having a logic level of 1 when the signals on lines 98 and 100 have the identical polarity, the detector 94 providing a logic level of 0 on line 104 when the signals on lines 98 and 100 have opposite polarity. The signals on line 104 are then combined by the integrator 96. The integrator 96 may be readily implemented by means of a low pass filter to provide the correlator output signal on line 80.

In operation, the KEY signal, coupled via line 62 to the correlator 48, initiates operation of the timing unit 92 which, in accordance with clock signals C, operates the switch 84 and the shift register 88 to admit the reference pulse train signal from line 66 to the shift register 88. The shift register 88 has N cells which is equal to the number, N, of pulses in the pulse train on lines 66. Thereafter, the switch 84 couples the signals from line 98 to the shift register 88 so that the reference signal is recirculated through the shift register 88.

The shift register 90 has one less cell than does the shift register 88. The clocking rate of the shift registers 88 and 90 is sufficiently high that a complete cycle of recirculation of the data can occur within one period of the pulse train on line 66. Once during each recirculation of data through the shift register 90, the switch 86 is operated to accept one new sample of the echo signal from line 70 so that the shift register 90 gradually fills up as the echo samples arrive along line 70. After the shift register 90 is filled, the first sample to have been entered therein is discarded in favor of a new sample arriving on line 70. The two shift registers 88 and 90 are clocked by the timing unit 92 at the same rate, and since the number of cells differ in the two shift registers 88 and 90, the two recirculations of data are seen to precess, one with respect to the other, whereby coincidences of plurality between one sample of the echo signal can be compared against each sample of the reference signal. Since the correlator 48 utilizes only one bit samples the output signals of the detector 94 on line 104 are the same as those which would be produced if the signals on lines 98 and 100 were multiplied together as is done in the multiple bit correlator. The rate of occurrence of signals on line 104 is the same as that of the clocking signals of the shift registers 88 and 90, this being very much faster than the repetition frequency of the pulses in a pulse train on signal line 66. The logic level of 1 on line 104 is represented by a high voltage while the logic level of 0 is represented by a low voltage so that the magnitude of the output signal of the integrator 96 on line 80 is seen to build up when many logic 1 signals are present and is seen to diminish with decreasing occurrences of the logic 1 signals. In the event that the integration of the integrator 96 is accomplished by means of a low-pass filter, the cut-off frequency of the low pass filter is equal to the base bandwidth of the frequency modulation provided by the signal generator 36 of FIG. 2.

Figure 4:
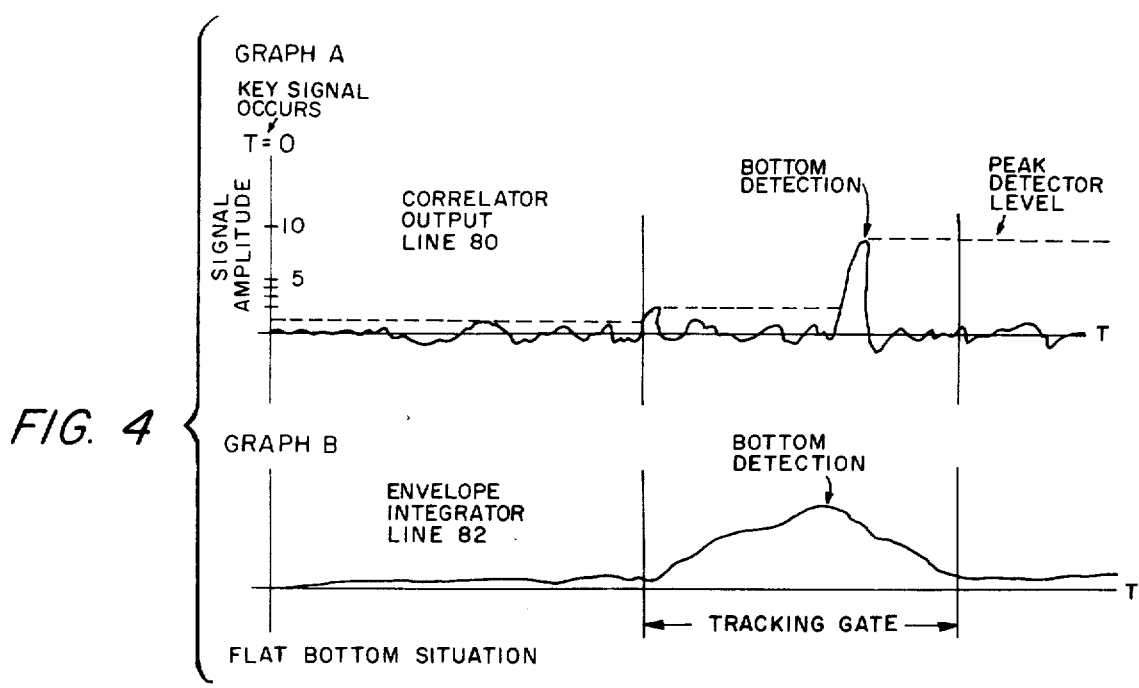
FIG. 4 is a graphical portrayal of output signals from the correlator and envelope detector of the system of FIG. 2 for reflections off of the level bottom of FIG. 1.

Referring now to FIG. 4, there are seen two graphs, graph A and graph B, showing, respectively, the correlator output on line 80 and the output of the envelope detector and integrator on line 82 of FIG. 1. FIG. 4 portrays the situation of the level bottom 28 of FIG. 1 for a firm bottom and a high signal-to-noise ratio. Graph A shows a succession of small pulses occurring at irregular intervals with one large pulse indicating detection of the bottom. The horizontal axis labeled T shows the time of occurrence of the bottom detection pulse. The KEY signal on line 62 of FIG. 2 occurs at the beginning of each sounding at the time T=0. Graph B shows a gradual build-up and a gradual tapering off of the received echo indicating detection of the ocean bottom, the width of the pulse being much wider than the corresponding pulse of graph A since the correlator 48 acts as a matched filter responsive to the broad spectrum modulation provided by the generator 36 of FIG. 2 and, accordingly, provides a much narrower pulse than that obtainable from the envelope detector 46 and integrator 50 of FIG. 2.

Figure 5:
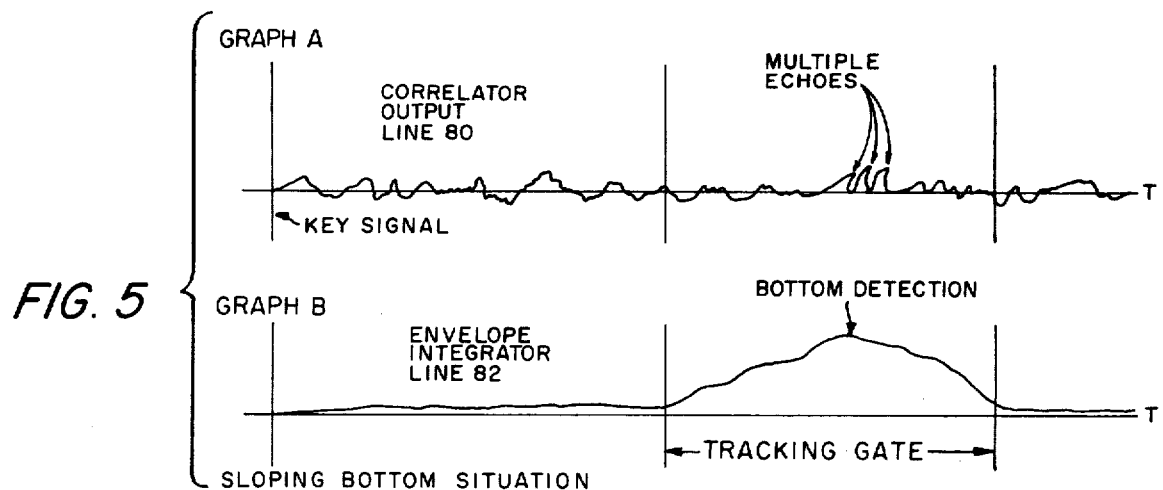
FIG. 5 is a graphical portrayal of output signals from the correlator and envelope detector of FIG. 2 for reflections off of the sloping bottom of FIG. 1.

FIG. 5 also shows two graphs, graph A and B, with graph A representing the correlator output on line 80 and graph B representing the output of integrator on line 82 of FIG. 2. FIG. 5 portrays the situation of the sloping bottom 30 of FIG. 1 as well as for a sedimentary bottom of the ocean with a high signal-to-noise ratio. It is seen that the correlator 48 produces a succession of multiple echoes all of which are of substantially reduced amplitude as compared to the bottom detection pulse of graph A in FIG. 4. By way of contrast, it is noted that graph B of FIG. 5 shows a pulse from the envelope detector 46 and the integrator 50 indicating detection of the bottom, this pulse being of the same general form as that shown in the graph B of FIG. 4. Thus, it is seen that a sloping or sedimentary bottom of the ocean leaves the output of an envelope detector relatively unchanged while greatly altering the output of a one bit correlator.

Figure 6:
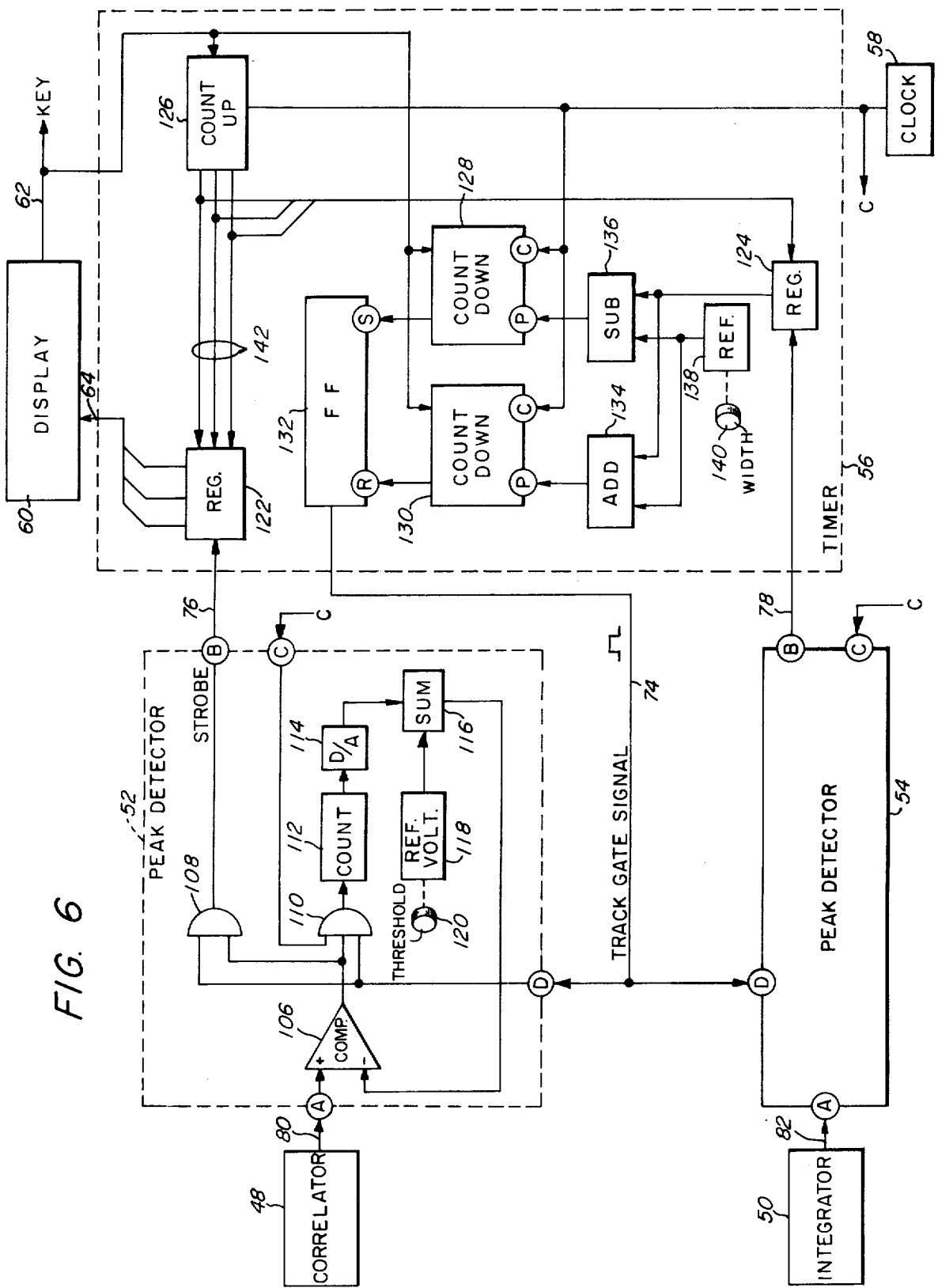
FIG. 6 is a block diagram of the peak detectors and timer of FIG. 2.

Referring now to FIG. 6, there is seen a block diagram of the peak detectors 52 and 54 and the timer 56 with their interconnections to the correlator 48, the integrator 50, the display 60 and the clock 58 of FIG. 2. Each of the peak detectors 52 and 54 comprises the same components, namely a comparator 106, AND gates 108 and 110, a counter 112, a digital-to-analog converter, referred to hereinafter as converter 114, a summing circuit 116, and a variable source 118 of a reference voltage having a knob 120 coupled thereto for adjusting the magnitude of the reference voltage. The timer 56 is seen to comprise registers 122 and 124, counters 126, 128 and 130, a set-reset flip-flop 132, an adder 134, a subtractor 136 and a variable source 138 of digital numbers which provides a set of voltages representing logic states of 1 and 0 in accordance with a digital number selected by a knob 140 coupled to the source 138.

The circuitry of the peak detectors 52 and 54 is similar to that disclosed in FIG. 3 of the aforementioned Backman patent. The comparator 106 senses the differences in magnitude between the analog voltage provided by the correlator 48 at its output on line 80 and the magnitude of the analog voltage provided at the output of the summing circuit 116. The signal from the correlator 48 is applied by a terminal A to the plus input terminal of the comparator 106 while the signal from the summing circuit 116 is coupled to the minus input terminal of the comparator 106. When the signal at the plus input terminal is of greater magnitude than the signal at the minus input terminal of the comparator 106, the comparator 106 provides a logic state of 1 to the AND gates 108 and 110. When the magnitude of the signal at the plus terminal of the comparator 106 does not exceed the magnitude of the signal at the minus terminal of the comparator 106, the comparator 106 applies a logic state of 0 to the AND gates 108 and 110.

The track gate signal on line 74 is of relatively high voltage corresponding to a logic state of 1 during the presence of the track gate signal, the lines 74 having a relatively low voltage representing a logic state of 0 during the absence of the track gate signal. The track gate signal is coupled by a terminal D to both peak detectors 54 and 54, and, with respect to the peak detector 52, provides an output logic 1 signal from the AND gate 108 when the correlator 48 provides a signal having a greater magnitude than that provided by the summing circuit 116. The clock signal C, applied by a terminal C of the peak detector 52, is coupled along with the track gate signal of line 74 and the output of the comparator 106 to the AND gate 110, which, accordingly, passes clock pulses to the counter 112 whenever the signal at terminal B from the AND gate 108 is at a logic level of 1.

The counter 112 counts clock pulses passed by the AND gate 110 and presents its count, a digital number, to the converter 114 which converts the digital number representing the count to an analog voltage, which is summed together with a voltage from the source 118 by the summing circuit 116 to provide the aforementioned signal which is coupled to the minus input terminal of the comparator 106. It is seen that during a counting via the counter 112, the output signal of the converter 114 is steadily increasing until such time as the magnitude of the signal at the minus input terminal of the comparator 106 equals or exceeds the magnitude of the signal at terminal A, at which time the comparator 106 provides a logic 0 signal which turns off the AND gate 110 so that no more clock pulses from terminal C arrive at the counter 112. Should the output signal from the correlator 48 again exceed the value of the output of the summing circuit 116 during the duration of the track gate signal on line 74, the counter 112 would again begin to count until the output of the summing circuit 116 either equals or exceeds the signal at terminal A.

Thus, it is seen that the counter 112 counts at all times during the duration of the track gate signal at terminal D when the correlator signal at terminal A exceeds the output signal of the summing circuit 116, and as mentioned hereinbefore, the signal at terminal B is a logic 1 signal during such times as when the counter 112 is counting. The final count of the counter 112 during the duration of the track gate signal is thus at the peak amplitude reached by the output signal of the correlator 48, and, accordingly, the last instant of time when the signal at terminal B is a logic 1 signal corresponds to the peak output signal from the correlator 48 during the duration of the track gate signal at terminal D. As will be seen in the ensuing discussion of the timer 56, the signal at terminal B serves as a strobe signal for strobing the register 122.

The counter 126 of the timer 46 counts clock pulses from the clock 58 and is reset to 0 by the KEY signal on line 62. The count of the counter 126 is made available along lines 142 to the registers 122 and 124. The strobing of the register 122 by the signal at terminal B provides for a reading of the count of the counter 126 by the register 122, that reading continually being updated as long as the strobe signal has a logic state of 1. At the termination of the track gate signal on line 74, the digital number stored in the register 122 is the count of the counter 126 at the time of occurrence of the peak amplitude of the output signal of the correlator 48. This number was obtained by counting clock pulses of the clock 58 and, accordingly, represents the length of time elapsed from the occurrence of the KEY signal until the time of occurrence of the peak amplitude of the output correlator 48. Thus, the number stored in the register 122 is proportional to the depth or range of the reflecting surface in the ocean 22 of FIG. 1 from which emanated the peak echo signal in the correlator output. The depth data is coupled from the register 122 via a set of lines coupling the digits of a number representing the data, the lines fanning into the line 64 to the display 60.

The peak detector 54 operates in the same fashion as does the peak detector 52, however, terminal A of the peak detector 54 is coupled to the integrator 50 and, accordingly, the strobe signal provided by terminal B on line 78 to the register 124 is obtained upon the occurrence of the peak amplitude in the signal on the line 82 from the integrator 50. The number stored in the register 124 is range data just as is the number stored in the register 122, the data of the register 124 being the depth as measured by the envelope detector 46 and the integrator 50.

The flip-flop 132 generates the track gate signal on line 74. The signal is initiated by the setting of the flip-flop 132, the setting being accomplished by a trigger applied to the set terminal of the flip-flop 132 by the counter 128. The track gate signal is terminated upon the resetting of the flip-flop 132 by a trigger applied to the reset terminal thereof, by the counter 130. The counters 128 and 130 count down from a preset number, the preset numbers being applied to terminals P in each of the counters. As is the case with the counter 126, the counters 128 and 130 count clock pulses from the clock 58. The counter 128 is preset by a number provided by the subtractor 136, and the counter 130 is preset by a number provided by the adder 134. The subtractor 136 is coupled to the register 124 and to the reference source 138 and subtracts the digital number of the reference source 138 from the digital number stored in the register 124, the difference being the number to which the counter 128 is preset. The adder 134 is similarly coupled to both the register 124 and the reference source 138 and provides a digital number representing the sum of the numbers of the source 138 and the register 124, this digital sum being the number to which the counter 130 is preset.

The counting by the counters 128 and 130 is initiated by the KEY signal on line 62. Since the counter 128 is preset to a digital number of smaller magnitude than that to which the counter 130 is preset, the counter 128 reaches a count of 0 and triggers the flip-flop 132 prior to the time when the counter 130 reaches a count of 0 and triggers the flip-flop 132. In this way the counter 128 initiates the track gate signal while the counter 130 terminates the track gate signal. It is readily seen that the number stored in the register 124 represents the depth or range corresponding to the midpoint of the track gate signal while the number provided by the reference source 138 corresponds to one-half the duration of, or corresponding width in distance, of the track gate signal on line 74. In this way, it is seen that the envelope detector 46 and integrator 50 determine the placement in time and depth of the track gate signal 74 and, accordingly, the time interval when the peak detector 52 is operative to measure the time of occurrence of the pulse signal from the correlator 48. It is noted that the foregoing digital circuitry is operative independently of the form of radiant energy radiated into the ocean 22 of FIG. 1 and, accordingly, is applicable to measurements employing, for example, electromagnetic energy of a frequency low enough to propagate through the ocean.

Referring also to FIGS. 4 and 5, the graphs A and B in each of the figures show a placing of the tracking gate as provided by the track gate signal. In both FIGS. 4 and 5, the placing of the tracking gate based on the envelope detection by the envelope detector 46 of FIG. 2 serves to resolve ambiguities in the pulses provided by the correlator 48. Particularly in FIG. 5, such ambiguity resolution is required because of the relative similarity in amplitudes of the various pulses produced by the correlator 48. Also shown in FIG. 4 is a dashed line representing the peak detector level, this being the magnitude of the count of the counter 112 of the peak detector 52. It is seen that the peak detector level reaches its maximum value at the time when the correlator 48 provides its maximum output signal during the interval of the tracking gate.

It is understood that the above described embodiment of the invention is illustrative only and that modifications thereof may occur to those skilled in the art. Accordingly, it is desired that this invention is not to be limited to the embodiment disclosed herein, but is to be limited only as defined by the appended claims.

What is claimed is:

1. A ranging system comprising:
    means for receiving echoes from a reflecting surface, said receiving means including means for obtaining one bit samples of said echoes;
    means for correlating said samples of said echoes against a reference of said echoes signals;

means coupled to said receiving means detecting an envelope of a sequence of said echoes, said detecting means including means for combining signals of individual ones of said echoes of said sequence of said echoes to provide said envelope of said sequence of said echoes;

means coupled to said correlating means for measuring the time of occurrence of a peak in an output signal of said correlator; and means coupled between said envelope detecting means and said time measuring means for operating said time measuring means during an interval of time designated by said envelope detecting means.

2. A system according to claim 1 wherein said correlating means is a one bit correlator.

3. A system according to claim 1 wherein said time measuring means includes means for signaling a peak in said output signal of said correlator.

4. A system according to claim 3 wherein said combining means comprises filtering means for matching the impulse response of said envelope detecting means to the envelope of anticipated echoes.

5. A system according to claim 3 wherein said envelope detecting means includes means for signaling the occurrence of a peak in an output signal of said envelope detecting means.

6. A system according to claim 5 wherein said time measuring means includes a generator responsive to said envelope detector peak for generating a gate signal, said generator signal gating said means for signaling the time of occurrence of said peak in said output signal of said correlator.

7. A system according to claim 6 further comprising means for transmitting a signal towards said reflecting surface, said transmitting means coupling a replica of said transmitted signal to said correlating means, said replica serving as said reference for said correlator.

8. A system according to claim 1 further comprising means for transmitting a signal towards said reflecting surface, said transmitting means coupling a replica of said transmitted signal to said correlating means, said replica serving as said reference for said correlating means.

9. A system comprising:

means coupled to a medium propagating radiant energy for receiving a pulse of radiant energy therefrom;

means for providing a reference signal of said pulse of radiant energy;

means coupled between said receiving means and said reference means for correlating said received pulse with said reference signal; and means coupled between said receiving means and said correlating means for selecting an output signal of said correlating means occurring during a time interval bracketing a portion of said received pulse of radiant energy; and wherein said selecting means includes means coupled to said receiving means for detecting an envelope of a sequence of said pulses of radiant energy, said detecting means including means for combining signals of individual ones of said pulses of said sequence of said pulses of radiant energy to provide said envelope of said sequence of pulses, said selecting means further comprising timing means responsive to said envelope for providing said time interval.

* * * * *